United States Patent [19]

Lin

[11] Patent Number: 4,910,475
[45] Date of Patent: Mar. 20, 1990

[54] POLE GROUPING FOR STEPPING MOTOR

[75] Inventor: Ted T. Lin, Cupertino, Calif.

[73] Assignee: Linex Technology Corporation, Santa Clara, Calif.

[21] Appl. No.: 329,446

[22] Filed: Mar. 28, 1989

[51] Int. Cl.$^4$ .......................................... H02K 37/14
[52] U.S. Cl. ................................. 310/49 R; 310/254; 318/696
[58] Field of Search .................... 310/49 R, 162, 254; 518/696

[56] References Cited

U.S. PATENT DOCUMENTS

| | | | |
|---|---|---|---|
| 3,866,104 | 2/1975 | Heine | 318/696 |
| 3,978,356 | 8/1976 | Spiesberger | 310/49 R |
| 4,623,809 | 11/1986 | Westley | 310/49 |
| 4,638,105 | 1/1987 | Lin | 310/49 |
| 4,695,777 | 9/1987 | Asano | 318/135 |
| 4,748,362 | 5/1988 | Hedlund | 310/168 |
| 4,754,178 | 6/1988 | Kavanaugh | 310/49 |
| 4,758,752 | 7/1988 | Leenhouts | 310/49 |

FOREIGN PATENT DOCUMENTS 131067  7/1985  Japan ................................ 310/49 R

OTHER PUBLICATIONS

P. P. Acarnley, "Stepping Motors", 1982, pp. 1-59, Peregrinus (IEE), N.Y.

Primary Examiner—Patrick R. Salce
Assistant Examiner—D. L. Rebsch
Attorney, Agent, or Firm—Thomas Schneck

[57] ABSTRACT

Hybrid stepping motor apparatus that produces a step angle of $1/K_p$ times the pitch angle $\Delta\theta_p$ of the stator on rotor teeth, where $K_p$ is the number of phases for the motor, using a plurality of stator poles whose center-to-center angular spacings are not uniform, and depend on the number of stator poles used. In one embodiment with M poles, the first M-1 center-to-center pole angular spacings are equal to a first angle A, and the Mth center-to-center pole angular spacing is an angle B with $|A-B| = m\Delta\theta_p$, where m is a positive integer.

17 Claims, 2 Drawing Sheets

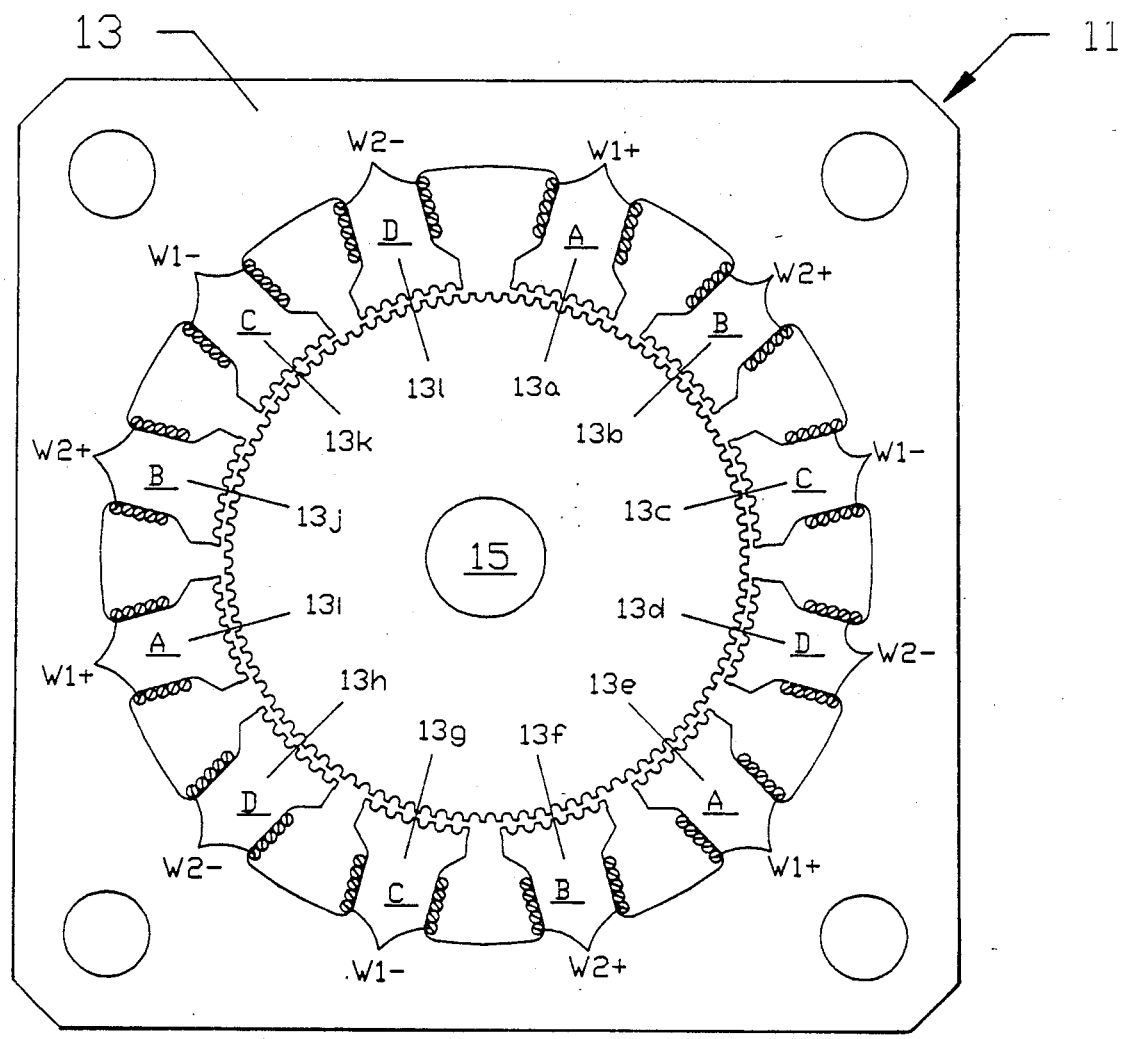
FIG._1

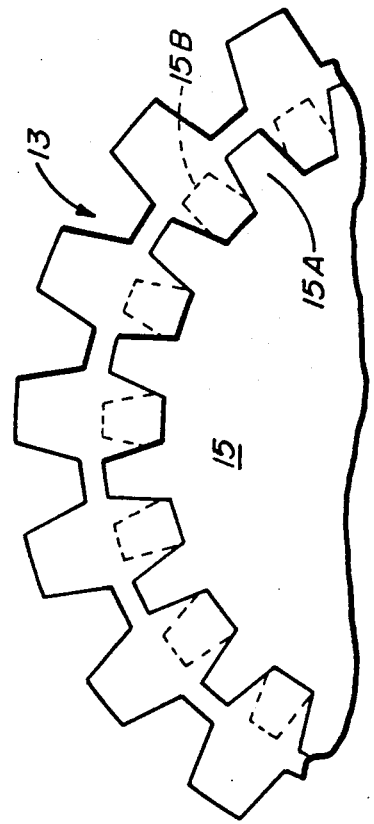
FIG._3
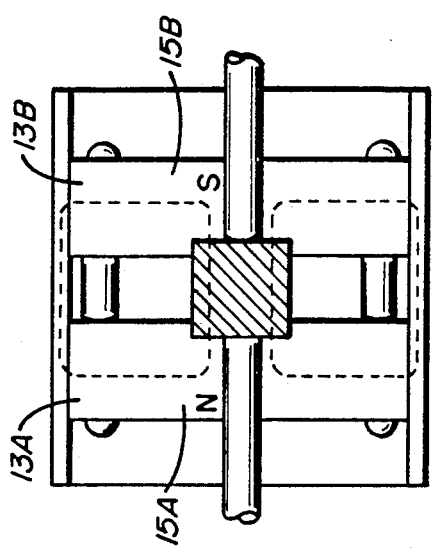
FIG._2
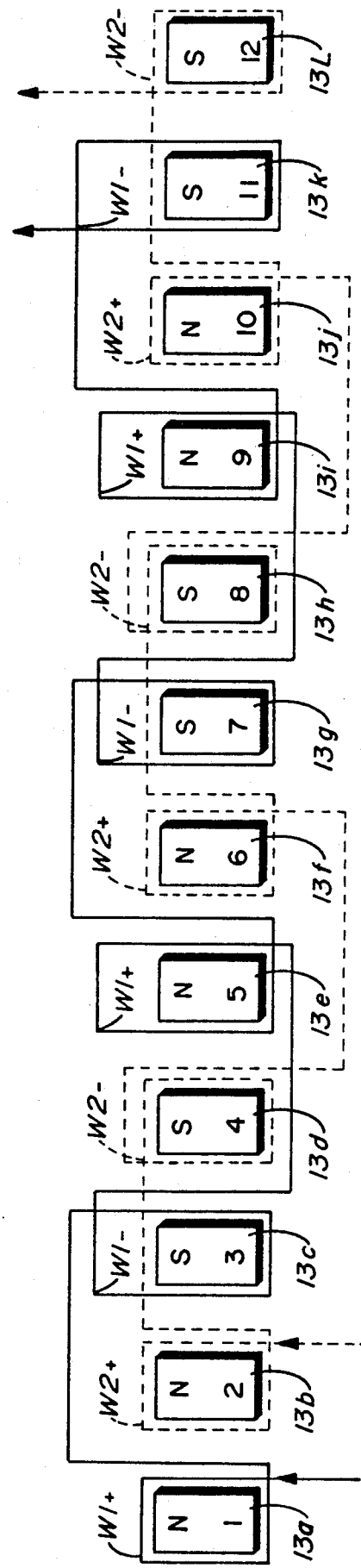
FIG._4

POLE GROUPING FOR STEPPING MOTOR

DESCRIPTION

1. Technical Field

This invention relates to stepping motors and to improved step response techniques for stepping motors.

2. Background Art

Stepping motors, which allow control of rotation of a rotor or shaft relative to a fixed stator that circumferentially surrounds the shaft or rotor within certain accuracy limits, have been available for many years. Because of the use of such stepping motors in transistor fabrication, reduction of the step angle by which the rotor is controllably advanced is of considerable interest. Heine, in U.S. Pat. No. 3,866,104, discloses a five-phase stepping motor in which the windings associated with four of the phases are energized and the winding associated with the fifth phase is not activated; location of the non-activated winding moves from one winding to the next to control the rotational position of the rotor relative to the stator. The angular width of the rotor teeth appear to be somewhat smaller than the angular width of the stator teeth, and the inventor appears to use stator poles with uniform center-to-center spacing.

In U.S. Pat. No. 4,623,809, Westley discloses use of a stator with specially designed stator pole fingers that re bent away from the plane of the stator and are intended to provide a low reluctance path for magnetic flux in the rotor-air gap-stator circuit.

A multiple pole stepping motor is disclosed by Lin in U.S. Pat. No. 4,638,195, where poles of uniform center-to-center spacing are used and M(>2) stator windings, each with a different phase, are used to facilitate rotation of the rotor. Different embodiments are disclosed for a hybrid stepping motor and for a variable reluctance stepping motor.

Asano, in U.S. Pat. No. 4,695,777, discloses a variable reluctance stepper motor having a stator with a plurality of uniformly spaced teeth and for slider poles, each with a winding having a different phase wound around the pole; with the spacings between the consecutive slider poles being 22(p/4), 19(p/4) and 22(p/4), where p is the pitch of a rotor tooth. The four windings are connected for alternating excitation so that, at each excitation, the slider pole is moved rightward or leftward by a distance p/4.

In U.S. Pat. No. 4,748,362, Hedlund discloses a dc motor having stator poles with at least two teeth each, where the gap between two adjacent teeth on adjacent poles is less than the gap between two teeth on the same pole. The center-to-center spacing of consecutive poles is uniform, as is the spacing between consecutive teeth in any given stator pole. The rotor teeth are specially shaped, and each has a first tooth portion that lies at a greater radius from the rotor center than does a second portion of the tooth.

Kavanaugh in U.S. Pat. No. 4,754,178, discloses a two-phase hybrid stepper motor having a stator that comprises eight laminations, with each lamination having a magnetic field associated with the lamination that is rotated by 45° with respect to the preceding lamination in the stack. The rotor includes a plurality of rotor teeth that are aligned with the stator teeth at rotations of 0°, 90°, 180°, and 270° and are out of alignment by a distance of p/4 with the stator teeth at rotations of 45°, 135°, 225° and 315°. Center-to-center spacing of the stator poles appears to be uniform.

A high speed hybrid stepper motor is disclosed by Leenhouts in U.S. Pat. No. 4,758,752. The stator includes a plurality of groups of poles, and two adjacent teeth in adjacent poles have an angular separation that is different from the angle between two teeth in the same pole. Center-to-center spacing of adjacent poles appears to be uniform.

An object of the invention is to provide a hybrid stepping motor with an arbitrary number of stator poles and improved accuracy and torque.

Another object is to allow use of smaller step angles for a hybrid stepping motor.

SUMMARY OF THE INVENTION

These objects are met by provision of a multiple pole stepping motor apparatus that allows the rotor teeth of the motor to advance by controllably small step angle of the order of $1/K_p$ times the rotor tooth pitch angle, where $K_p$ is the number of phases of the motor. An arbitrary number of stator poles may be prescribed, but one attractive choice is a twelve-pole, four-phase motor with an associated rotor step angle of 0.9°. The center-to-center spacing of adjacent stator pole sectors is allowed to be non-uniform. A twelve-pole motor with 100 rotor teeth provides eleven center-to-center pole spacings of 27.9° and one such spacing at 33.3° in one embodiment. More general prescriptions for the center-to-center spacing of adjacent poles for an M-pole motor are set down, where M is an integral multiple of the number of phases.

The sequence of center-to-center stator pole spacings, number of poles, pitch angles and associated step angles must satisfy a number of simultaneous equations so that only certain combinations of these variables are physically realizable. These equations are developed for the general case and are applied to interesting specific examples. In one embodiment for an N-pole motor, $N-1$ of the center-to-center pole angular spacings $\alpha$ are equal and the Nth center-to-center pole spacing has a value $\alpha'$ that differs from $\alpha$ by an integral multiple of the pitch angle for the rotor.

BRIEF DESCRIPTION OF THE DRAWINGS

FIG. 1 is a schematic end view of a stepping motor constructed according to one embodiment of the invention for a twelve-pole motor.

FIG. 2 is a schematic sectional side view of the invention shown in FIG. 1, indicating the directions of the magnetic flux lines in the rotor and stator components.

FIG. 3 is a schematic end view of the placement of the rotor teeth for the two rotor components 15A and 15B shown in FIG. 2.

FIG. 4 is a schematic view of the winding patterns used for the two current windings used in the twelve-stator embodiment shown in FIG. 1

BEST MODE FOR CARRYING OUT THE INVENTION

FIG. 1 illustrates one embodiment of the stator-rotor combination 11 that is part of the invention, in a schematic end view. FIG. 1 illustrates a motor having twelve stator poles 13a, 13b, . . . , 13l, with each stator pole having substantially the same pole sector angular width. The center-to-center spacing of consecutive poles is not uniform but satisfies the relations $\Delta\theta_{pp,i}=29.7°$ for $i=1, 2, \ldots, 11$ and $\Delta\theta_{pp,12}=33.3°$. The stepping motor itself is a hybrid motor having a permanent magnet in its rotor, and FIG. 2 illustrates the local direction of magnetic flux lines that are present in a permanent magnet core 21, in the two soft-iron end caps 23a and 23b for the two-stack motor, in the stator teeth 15a and 15b, in the rotor-stator air gap, and in the stator return circuit end iron 13c.

In the embodiment shown in FIG. 1, the rotor has 100 uniformly spaced teeth with a rotor tooth pitch of 3.6°, and the stator tooth pitch is also 3.6° within a particular stator pole. For the chosen stator pole pitch of 3.6°, a pole could have one to eight adjacent pole teeth, and the embodiment shown in FIG. 1 uses seven stator teeth per pole as an example. Where two consecutive poles have a center-to-center spacing of 29.7°=8(3.6°)+0.9°, if seven consecutive rotor teeth are precisely aligned with seven stator teeth on one of these poles, the seven rotor teeth that are adjacent to the stator teeth on the other of these poles will be misaligned by an angle of 0.9°, which is taken to be the step angle for this embodiment of the invention. Hybrid stepping motors are discussed generally in "Stepping Motors: A Guide to Modern Theory and Practice" by P. P. Acarnley, published by Peter Peregrinus, Ltd., 1982, pp. 1–58; and this discussion is incorporated herein by reference.

In a hybrid stepping motor, two separate windings, denoted W1 and W2 herein, are used for the stator poles for the twelve-pole motor shown in FIGS. 1 and 3, winding W1 would be wound positively around poles 1, 5 and 9 and would be wound in the opposite or negative sense around poles 3, 7 and 11. Similarly, winding W2 would be wound positively around poles 2, 6 and 10 and would be wound in the opposite or negative sense around poles 4, 8 and 12. The result of this choice of windings is that the windings for poles 1–12 shown in FIG. 4 have the orientations W1+, W2+, W1−, W2−, W1+, W2+, W1−, W2−, W1+, W2+, W1−, W2−, respectively. When a direct current is caused to flow in winding W1, this induces a vector magnetic field B1 that is radially directed as shown in the stator poles 1, 3, 5, 7, 9 and 11. Note that the direction of the magnetic field B1 alternates between being directed outwardly and being directed inwardly as one proceeds from one pole in this group of six to the next pole in the group. In one embodiment, during the time that direct current flows in the winding W1, no current flows in the winding W2. After a predetermined time interval $\Delta t_w$, the direct current in winding W1 is terminated and direct current of equal magnitude is established in the winding W2; this produces the vector magnetic field B2, also radially directed, in each of the stator poles 2, 4, 6, 8, 10 and 12. Note that the magnetic field direction also alternates from one pole in this group of six to the next pole in the group. Direct current flows alternatingly or simultaneously in the windings W1 and W2.

The rotor, shown in side view in FIG. 2, comprises two sets of uniformly spaced rotor teeth, with each set being arranged in a circular pattern and lying in a plane, where the two planes are parallel but spaced apart from each other. Viewed along the rotor axis that is perpendicular to these two planes, the two sets of rotor teeth are offset from one another by an angle that is one half the rotor pitch angle, as illustrated in FIG. 3. Thus, if the rotor teeth in one of these sets are out of alignment with corresponding stator teeth by one-half the pitch angle, the rotor teeth in the other set are aligned with the corresponding sator teeth, and conversely.

Assume that current is flowing only in winding W1 in a particular time interval of length $\Delta t_u$ and that certain rotor teeth adjacent to poles 1, 5 and 9 are approximately aligned with the corresponding stator pole teeth in those three poles. The rotor 15 is free to rotate, and it will attempt to rotate to a position that minimizes the reluctance $S = L/\mu A$ for the magnetic circuit shown in FIG. 2, where L, A and $\mu$ are the length, area and magnetic permeability for a component of the circuit. The reluctance of all components of this circuit except the air gap component are substantially unchanged for any angular position of the rotor 15. Thus, a first set of rotor teeth will attempt to rotate to a position that minimizes the reluctance associated with the air gap component of the magnetic circuit in FIG. 2; and this will occur when seven consecutive rotor teeth in that set, shown in FIG. 1, are precisely aligned with seven stator pole teeth for each of the poles 1, 5 and 9 shown in FIG. 1. At this point, seven consecutive rotor teeth that are adjacent to the stator pole teeth for each of the poles 3, 7 and 11 will be one-half pitch angle or 1.8° out of alignment for the first rotor teeth set; but the poles 3, 7 and 11 of the second set of rotor teeth will be aligned, and the poles 1, 5 and 9 of this second set of rotor teeth will be out of alignment by one half the pitch angle. Keeping in mind the effects of the angular offset of one set of rotor teeth relative to the other set of rotor teeth, attention is focused on only one of the two sets of rotor teeth. The reluctance associated with the magnetic flux circuit that includes the rotor teeth for poles 3, 7 and 11 of the first set is less effective than the reluctance associated with the magnetic flux circuit that includes rotor teeth from the first set for poles 1, 5 and 9; and, in a first approximation, the rotor alignment force for the rotor teeth adjacent to poles 1, 5 and 9 is the factor initially considered here.

During a second time interval of length $\Delta t_w$, the current in winding W1 is terminated and the current in winding W2 is established. The inertia of the rotor, which is moving clockwise in this embodiment, plus the alignment force associated with the seven rotor teeth that are adjacent to each of stator poles 2, 6 and 10, cause the teeth of the rotor 15 to rotate clockwise by one-quarter of the pitch angle or 0.9° so that these rotor teeth are now perfectly aligned with the seven stator teeth for each of the poles 2, 6 and 10; misalignment of the rotor teeth of either set adjacent to stator poles 4, 8 and 12 is ignored, to a first approximation. This requires rotation of the teeth in each set of the rotor 15 by an angular amount of one-quarter of the pitch angle or 0.9° during a time interval of length $\Delta t_w$. The rotation continues during a third time interval of length $\Delta t_w$, wherein the current in the winding W2 is terminated and current in the winding W1 is re-established. During this third time interval of length $\Delta t_w$, seven rotor teeth adjacent to the seven stator teeth in each of the poles 3, 7 and 11 are now aligned therewith. During a fourth time interval of length $\Delta t_w$, seven rotor teeth that are adjacent to the seven stator teeth in each of the poles 4, 8 and 12 are aligned therewith. The result of this action is that the rotor moves a distance of 4(0.9°)=3.6° in a time interval of $4\Delta t_w$. This corresponds to a rotational speed of $(400\Delta t_w)^{-1}$. The effect is qualitatively unchanged for the two poles that have a center-to-center pole spacing of 33.3°=9(3.6°)+0.9°. Thus, the alignment forces are qualitatively unchanged from one pole to the next consecutive pole for each of the twelve stator pole spacings shown in FIG. 1.

As noted above, the sets of teeth for the two rotor components 15a and 15b shown in FIG. 2 are offset from one another by an angle $\Delta\psi=1.8°$ for rotors with pitch angle of 3.6°. This is illustrated in FIG. 3, which shows apportion of the rotor component 15A and associated rotor teeth in bold lines and shows a portion of the rotor component 15B and associated rotor teeth with hidden lines behind the rotor component 15A. In FIG. 3, the angular offset by half the pitch angle, $\Delta\psi=1.8°$, is manifested by the appearance of several teeth of the rotor component 15B at the center of the spacings or low points between adjacent teeth of the rotor component 15A.

For a twelve-pole hybrid stepping motor with 100 rotor teeth on each rotor component, the appropriate center-to-center spacings of consecutive poles are 29.7° for eleven of the gaps and 33.3° for the twelfth gap. For an eight-pole hybrid stepping motor with 100 rotor teeth, the corresponding center-to-center spacings of consecutive poles are 44.1° for seven of the pole gaps and 51.3° for the eighth pole gap. For a 20-pole hybrid stepping motor with 100 rotor teeth, the corresponding center-to-center spacings of consecutive poles are 17.1° for 19 of the pole gaps and 35.1° for the twentieth pole gap. These possibilities are set forth in Table 1.

TABLE 1

Center-to-center pole spacings for rotor with 100 teeth.

| No. of poles | Smaller Angular Spacing | Larger Angular Spacing |
|---|---|---|
| 8 | 44.1° | 51.3° |
| 12 | 29.7° | 33.3° |
| 20 | 17.1° | 35.1° |

The conventional approach uses uniform center-to-center spacings of consecutive stator poles. In the invention disclosed here, the center-to-center spacings of consecutive poles are not uniform. This approach allows use of a smaller step angle, $\Delta\theta_s=0.9°$ in the embodiment illustrated in FIG. 1, and it allows development of correspondingly higher static holding torques, as desired, with use of this invention. The important feature here is that each of the two center-to-center spacings of consecutive poles be greater than an integral multiple of the pitch angle, 3.6° herein, by one-fourth of the pitch angle. This allows development of the desired tooth misalignment by ¼, 2/4, ¾ an 4/4 of the pitch angle at four consecutive poles on the stator.

The invention disclosed herein is not limited to an eight-pole, twelve-pole or twenty-pole motor and is not limited to a rotor having 100 teeth. The same considerations apply for a $4n_1$-pole motor and for a rotor having $2n_2$ rotor teeth; the step angle produced will be $360°/8n_2$ for a four-phase motor.

The examples of motors discussed thus far assume that the number of stator poles is a multiple of four, such as 8, 12 or 20. More generally, a motor with M poles may be used, where M is any positive integer, and the number of phases for the motor may be any positive integer $K_p$ that is a divisor of the integer M; that is, $M=K \cdot K_p$, where K is also a positive integer. For the twelve-pole, three-phase motor considered above, $M=12$, $K_p=3$ and $K=4$. The angle between center lines of two adjacent stator poles would be $$A_o=360°/M \tag{1}$$

if these poles were uniformly spaced apart. Where, as here, the angular spacing between center lines of adjacent stator poles is not uniform, the first $M-1$ of the poles may have an angular spacing between adjacent center lines of $$\begin{aligned}A &= A_o \mp \Delta\theta(\Delta\theta > 0°) \\ &= (N \cdot K_p \pm 1)\Delta\theta_s\end{aligned} \tag{2}$$

where $\Delta\theta$ is the angular adjustment for such poles, N is a positive integer and $\Delta\theta_s$ is the step angle for the motor. The step angle $\Delta\theta_s$ would be chosen as $$\Delta\theta_s=\Delta\theta_p/K_p, \tag{3}$$

or an integral multiple thereof, where $\Delta\theta_p$ is the pitch angle for the teeth on the stator and rotor and must satisfy the relation $$360°=H \cdot \Delta\theta_p \tag{4}$$

where H is a positive integer. The angular spacing between the center lines of stator pole number M and stator pole number 1 is taken to be $$B=360°-(M-1)A, =A\pm K_p \cdot Q \cdot \Delta\theta_s. \tag{5}$$

where Q is an integer. The constrains set forth in Eqs. (1)–(5) must be simultaneously satisfied in order to construct a rotor with H teeth and a stator pole according to the invention.

One example of such a system is a 12-pole, two-phase stepping motor for which
$M=12$,
$K_p=4$,
$K=3$,
$A_o=30°$,
$H=120$,
$\Delta\theta_p 3.0°$,
$\Delta\theta_s 0.75°$,
$\Delta\theta=0.75°$,
$N=10$,
$A=29.25°$,
$B=38.25°$;
This system has 11 angular spacings of adjacent stator pole center lines of $A=29.25°$ and one angular spacing of $B=38.25°$.

Another example of such a system is a 15-pole, three-phase stepping motor for which
$M=15$,
$K_p=5$,
$K=3$,
$A_o=24°$,
$H=144$,
$\Delta\theta_p 2.5°$,
$\Delta\theta_s 0.5°$,
$\Delta\theta=0.5°$,
$N=25$,
$A=24.5°$,
$B=17°$.
This system has 14 angular spacings of adjacent stator pole center lines of $A=24.5°$ and one angular spacing of $B=17°$.

It is not, of course, guaranteed that for a particular choice of number of poles M, number of phases $K_p$ and number of rotor teeth H, one or more solutions for the angles A and B may be found that satisfy the constraints set forth in Eqs. (1)-(5). However, if angular spacings A and B can be found that satisfy all these constraints, plus the physical constraints $A \geq \Delta\theta_p$ and $B \geq \Delta\theta_p$ and $|B-A| = m\Delta\theta_p$ where m is a positive integer, the stepping motor corresponding to that solution may be fabricated and should operate according to the invention disclosed and claimed herein.

I claim:

1. A multiple pole stepping motor having a predetermined step angle and comprising:

an annular stator having a number $4n_1$ of stator poles, numbered consecutively 1, 2, 3, ..., $4n_1$ where $n_1$ is a positive integer, positioned around an inner circumference of the stator, where the stator poles are substantially identical and each stator pole has a plurality of pole teeth of approximately uniform pitch angle $\Delta\theta_p$ pole number i is separated from pole number i+1 by a first angle $\alpha$ for i=1, 2, ..., $4n_1-1$ and pole number $4n_1$ is separated from pole number 1 by a second angle $\alpha'$ with $|\alpha - \alpha'| = m\Delta\theta_p$ for some positive integer m;

a first current-carrying stator winding that winds around the stator poles numbered 1, 5, 9 ..., $4n_1-3$ in a first direction and winds around the stator poles numbered 3, 7, 11 ..., $4n_1-1$ in a second direction so that these two groups of poles have magnetic fluxes of opposite polarity when the first winding is activated;

a second current-carrying stator winding that winds around the stator poles numbered 2, 6, 10, ..., $4n_1-2$ in the first direction and winds around the stator poles numbered 4, 8, 12, ..., $4n_1$ in the second direction so that these two groups of poles have magnetic fluxes of opposite polarity when the second winding is activated;

an activatable current source connected to the first winding;

an activatable current source connected to the second winding; and activation means for periodically activating the first and second current sources to produce magnetic fluxes in each stator winding that is associated with the current source that is activated;

a rotor that has a plurality of uniformly spaced rotor teeth and is laterally surrounded by the stator, the rotor comprising magnet means polarized in an axial direction between a first end and a second end of the magnet means for producing a magnetic flux, and a first pole cap and a second pole cap that are attached to the first end and a second end, respectively, of the magnetic means, where the first pole cap and the second pole cap are angularly offset from one another by one half the pitch angle and each pole cap has a plurality of uniformly spaced rotor teeth attached at an outer circumference of that pole cap and the pitch angle of the rotor teeth is approximately equal to the pitch angle of the stator teeth within a stator pole.

2. A stepping motor according to claim 1, wherein the number of said motor teeth is 100 and said step angle is 0.9°.

3. The stepping motor of claim 2, wherein said number $4n_1=8$, said angle $\alpha=44.1°$ and said angle $\alpha'=51.3°$.

4. The motor of claim 2, wherein number $4n_1=12$, said angle $\alpha=29.7°$ and said angle $\alpha'=33.3°$.

5. The motor of claim 2, wherein said number $4n_1=20$, said angle $\alpha=17.1°$ and said angle $\alpha'=35.1°$.

6. A multiple pole stepping motor having a predetermined step angle $\Delta\theta_s$ and comprising:

an annular stator having a number M of stator poles, numbered consecutively 1, 2, 3, ..., M where M is a positive integer, positioned around an inner circumference of the stator, where the stator poles are substantially identical and each stator pole has a plurality of pole teeth of approximately uniform pitch angle $\Delta\theta_p$, pole number i is separated from pole number i+1 by a first angle $\alpha$ for i=1, 2, ..., M-1, and pole number M is separated from pole number 1 by a second angle $\alpha'$ with $|\alpha - \alpha'| = m\Delta\theta_p$ for some positive integer m, where the stator has $K_p$ phases, $M = K_p \cdot K$ and $K_p$ and K are positive integers;

a plurality of $N \geq 2$ current-carrying stator windings numbered j=1, 2, ..., N, each of which winds around a selected number of stator poles so that a magnetic flux is induced in each such selected stator pole when the stator winding is activated, where each stator pole has at least one stator winding wound therearound;

a plurality of $N \geq 2$ activatable current sources, numbered j=1, 2, ..., N, with current source number j being connected to stator winding number j;

activation means for periodically activating each of the current sources so that, when this activation pattern is implemented, any group of K consecutive stator poles numbered k=1, 2, ..., K is energized consecutively within this group so that any rotor teeth adjacent to the pole teeth of stator pole number k in this group are attracted to the pole teeth of that stator pole; and a rotor that has a plurality of uniformly spaced teeth and is laterally surrounded by the stator, the rotor comprising magnet means polarized in an axial direction between a first end and a second end of the magnet means for carrying a magnetic flux, and a first pole cap and a second pole cap that are attached to the first end and second end, respectively, of the magnet means, where the first pole cap and the second pole cap each have a plurality of substantially uniformly spaced rotor teeth attached at an outer circumference of that pole cap, and the pitch angle of the rotor teeth is approximately equal to the pitch angle of the stator teeth within a stator pole, where the number of rotor teeth is an integer H approximately equal to $360°/\Delta\theta_p$, where the step angle $\Delta\theta_s$ for the motor is equal to $\Delta\theta_p/K_p$, where the angles $\alpha$ and $\alpha'$ satisfy the relations $$\alpha = (360°/M) \pm \Delta\theta = (N.K_p \pm 1)\Delta\theta_s,$$

$$\alpha' = 360° - (M-1)\alpha = \alpha \pm Q.K_p.\Delta\theta_s,$$

and where $\Delta\theta$ is a small, positive offset angle and N and Q are positive integers.

7. The motor of claim 6, wherein said number of poles M is 12, said number of phases in $K_p=4$, said pitch angle is $\Delta\theta_p=3°$, said step angle is $\Delta\theta_s=0.75°$, and said angles $\alpha$ and $\alpha'$ are $\alpha=29.25°$ and $\alpha'=38.25°$.

8. The motor of claim 6, wherein said number of poles M is 15, said number of phases in $K_p=5$, said pitch angle is $\Delta\theta_p=2.5°$, said step angle is $\Delta\theta_s=0.5°$, and said angles $\alpha$ and $\alpha'$ are $\alpha=24.5°$ and $\alpha'=17°$.

9. A method for providing a multiple pole stepping motor having a predetermined step angle $\Delta\theta_s$, the method comprising the steps of:
   providing an annular stator having a number M of stator poles, numbered consecutively 1, 2, 3, ..., M where M is a positive integer, positioned around an inner circumference of the stator, where the stator poles are substantially identical and each stator pole has a plurality of pole teeth of approximately uniform pitch angle, pole number i is separated from pole number i+1 by a first angle $\alpha$ for i=1, 2, 3, ..., M−1, and pole number M is separated from pole number 1 by a second angle $\alpha'$, with $|\alpha-\alpha'|=m\Delta\theta_p$, where $\Delta\theta_p$ is the pitch angle and m is a positive integer, where the stator has $K_p$ phases, $M=K_p\cdot K$ and $K_p$ and K are positive integers;
   providing a plurality of $N\geq 2$ current-carrying stator windings numbered j=1, 2, ..., N, each of which winds around a selected number of stator poles so that a magnetic flux is induced in each such selected stator pole when the stator winding is activated, where each stator pole has at least one stator winding wound therearound;
   providing a plurality of $N\geq 2$ activatable current sources, numbered j=1, 2, ..., N, with current source number j being connected to stator winding number j;
   providing activation means for periodically activating each of the current sources so that, when this activation pattern is implemented, a group of K consecutive stator poles numbered k=1, 2, ..., K is energized consecutively within this group so that any rotor teeth adjacent to the pole teeth of stator pole number k in this group are attracted to the pole teeth of that stator pole;
   providing a rotor having a plurality of approximately uniformly spaced rotor teeth and being laterally surrounded by the stator, the rotor comprising magnet means polarized in an axial direction between a first end and a second end of the magnet means for carrying a magnetic flux, and a first pole cap and a second pole cap that are attached to the first end and second end, respectively, of the magnet means, where the first pole cap and the second pole cap each have a plurality of uniformly spaced rotor teeth attached at an outer circumference of that pole cap and the pitch angle of the rotor teeth is approximately equal to the pitch angle of the stator teeth within a stator pole; and
   choosing the number of rotor teeth to be an integer H that is substantially equal to $360°/\Delta\theta_p$, choosing the step angle $\Delta\theta_s$ to be substantially equal to $\Delta\theta_p/K_p$ or an integer, multiple of this value, and choosing the angles $\alpha$ and $\alpha'$ to satisfy the relations $\alpha=(360°/M)\pm\Delta\theta=(N\cdot K_p\pm 1)\Delta\theta_s$ $\alpha'=360°-(M-1)\alpha=\alpha+Q\cdot K_p\cdot\Delta\theta_s,$ where $\Delta\theta$ is a small, positive offset angle and N and Q are positive integers.

10. A method for providing a multiple pole stepping motor having a predetermined step angle $\Delta\theta_s$, the method comprising the steps of:
   providing an annular stator having a number M of stator poles, numbered consecutively 1, 2, 3, ..., M where M is a positive integer, positioned around an inner circumference of the stator, where the stator poles are substantially identical and each stator pole has a plurality of pole teeth of substantially uniform pitch angle, pole number i is separated from pole number i+1 by a first angle $\alpha$ for i=1, 2, 3, ..., M−1, and pole number M is separated from pole number 1 by a second angle $\alpha'$ with $|\alpha-\alpha'|=m\Delta\theta_p$, where $\Delta\theta_p$ is the pitch angle and m is a positive integer, where the stator has $K_p$ phases and $M=K_p\cdot K$ and $K_p$ and K are positive integers;
   providing a rotor having a plurality of uniformly spaced rotor teeth and being laterally surrounded by the stator, the rotor comprising magnet means polarized in an axial direction between a first end and a second end of the magnet means for carrying a magnetic flux, and a first pole cap and a second pole cap that are attached to the first end and second end, respectively, of the magnet means, where the first pole cap and the second pole cap each have a plurality of uniformly spaced rotor teeth attached at an outer circumference of that pole cap and the pitch angle of the rotor teeth is approximately equal to the pitch angle of the stator teeth within a stator pole;
   choosing the number of rotor teeth to be an integer H that is approximately equal to $360°/\Delta\theta_p$, choosing the step angle $\Delta\theta_s$ to be approximately equal to $\Delta\theta_p/K_p$ or an integer multiple of this value, and choosing the angles $\alpha$ and $\alpha'$ to satisfy the relations $\alpha=(360°/M)\mp\Delta\theta=(N\cdot K_p\pm 1)\Delta\theta_s,$ $\alpha'=360°-(M-1)\alpha=\alpha\pm Q\cdot K_p\cdot\Delta\theta_s,$ where $\Delta\theta$ is a small, positive offset angle and N and Q are positive integers; and
   providing a plurality of $N\geq 2$ activatable current carrying means, one such means being associated with each stator for periodically inducing in each stator a magnetic field so that a group of consecutive rotor teeth adjacent to the pole teeth in a stator pole is attracted to that stator pole when a current carrying means associated with that stator pole is activated.

11. A method for providing a multiple pole stepping motor having a predetermined step angle $\Delta\theta_s$, the method comprising the steps of:
   providing an annular stator having a number $4n_1$ of stator poles, numbered consecutively 1, 2, 3, ..., $4n_1$ where $n_1$ is a positive integer, positioned around an inner circumference of the stator, where the stator poles are substantially identical and each stator pole has a plurality of pole teeth of substantially uniform pitch angle, pole number i is separated from pole number i+1 by a first angle $\alpha$ for i=1, 2, 3, ..., $4n_1$, and pole number $4n_1$ is separated from pole number 1 by a second angle $\alpha'$ with $|\alpha-\alpha'|=m\Delta\theta_p$, where $\Delta\theta_p$ is the pitch angle and m is a positive integer;
   providing a rotor having a plurality of uniformly spaced rotor teeth and being laterally surrounded by the stator, the rotor comprising magnet means polarized in an axial direction between a first end and a second end of the magnet means for carrying a magnetic flux, and a first pole cap and a second pole cap that are attached to the first end and second end, repectively, of the magnet means, where the first pole cap and the second pole cap each have a plurality of uniformly spaced rotor teeth attached at an outer circumference of that pole cap and the pitch angle of the rotor teeth is approximately equal to the pitch angle of the stator teeth within a stator pole; and providing a plurality of $N \geqq 2$ activatable current carrying means, one such means being associated with each stator, for periodically inducing in each stator a magnetic field so that a group of consecutive rotor teeth adjacent to the pole teeth in a stator pole is attracted to that stator pole when a current carrying means associate with that stator pole is activated.

12. The motor of claim 1, wherein said activation means activates said first and said second current sources approximately simultaneously.

13. The motor of claim 1, wherein said activation means activates said first and second current sources sequentially.

14. The motor of claim 6, wherein said activation means activates said N current sources approximately simultaneously.

15. The motor of claim 6, wherein said activation means activates said N current sources sequentially.

16. The motor of claim 9, wherein said activation means activates said N current sources approximately simultaneously.

17. The motor of claim 9, wherein said activation means activates said N current sources sequentially.

* * * * *

UNITED STATES PATENT AND TRADEMARK OFFICE
CERTIFICATE OF CORRECTION

PATENT NO. : 4,910,475

DATED : March 20, 1990

INVENTOR(S) : Ted T. Lin

It is certified that error appears in the above-identified patent and that said Letters Patent is hereby corrected as shown below:

Column 1, line 28, "that re" should read - - that are - -.

Column 4, line 2, "length $\Delta t_u$" should read - - length $\Delta t_w$ - -.

Column 6, line 44, "$\Delta\theta_p 3.0°$," should read - - $\Delta\theta_p = 3.0°$, - -.

Column 6, line 45 "$\Delta\theta_s 0.75°$," should read - - $\Delta\theta_s = 0.75°$, - -.

Column 6, line 60, "$\Delta\theta_p 2.5°$," should read - - $\Delta\theta_p = 2.5°$, - -.

Column 6, line 61 "$\Delta\theta_s 0.5°$," should read - - $\Delta\theta_s = 0.5°$, - -.

Claim 2, column 7, line 65, "said motor teeth" should read
 - - said rotor teeth - -.

Claim 8, column 8, line 68, "phases in $K_p$ = 5," should read
 - - phases is $K_p$ = 5, - -.

Claim 11, column 11, line 16, "means associate with" should read
 - - means associated with - -.

Signed and Sealed this

Tenth Day of September, 1991

Attest:

HARRY F. MANBECK, JR.

*Attesting Officer*

*Commissioner of Patents and Trademarks*